United States Patent [19]

Mudra

[11] Patent Number: 5,495,301
[45] Date of Patent: Feb. 27, 1996

[54] THREE WIRE PILLOW SPEAKER WITH FULL TELEVISION REMOTE CONTROL FUNCTIONS

[75] Inventor: Robert E. Mudra, Glenview, Ill.

[73] Assignee: Zenith Electronics Corporation, Glenview, Ill.

[21] Appl. No.: 364,564

[22] Filed: Dec. 27, 1994

[51] Int. Cl.$^6$ .................................................... A04N 5/44
[52] U.S. Cl. ........................ 348/734; 348/730; 359/143; 340/825.25; 340/825.56; 340/825.57
[58] Field of Search ................................. 348/8, 12, 734, 348/730, 725; 359/143, 146; 455/4.1, 6.3, 5.1; 340/825.25, 825.56, 825.57, 825.60, 825.62; H04N 5/44

[56] References Cited

U.S. PATENT DOCUMENTS

| 4,398,178 | 8/1983 | Russ et al. | 340/825.62 |
| 4,549,179 | 10/1985 | Steadarde | 359/146 |
| 4,862,159 | 8/1989 | Marwa et al. | 340/825.25 |
| 5,175,441 | 12/1992 | den Hollander | 348/730 |
| 5,422,631 | 6/1995 | Gertz | 340/825.25 |

Primary Examiner—James J. Groody
Assistant Examiner—Jeffrey S. Murrell

[57] ABSTRACT

A full function remote control pillow speaker arrangement is coupled by three wires to a television receiver. The arrangement includes a standard IR control signal encoder, the output of which is filtered to remove the 40 kilohertz ultrasonic frequency, thus yielding an envelope corresponding to the data pulses. Operating power is supplied to the encoder from a DATA line and a common (COM) line with a shunt regulator being interposed to protect the encoder from over voltage conditions during standby operations. A speaker is supplied audio signals from the COM line and an AUDIO line. The receiver is capable of functioning with other types of pillow speaker control units, i.e. those having a single key closure for channel and on/off control and those with extra key closures for channel directional control. A circuit is included that discriminates between data pulses and key closures for transmitting data pulses to the television receiver IR data processing circuitry and transmitting key closures to receiver key scan processing circuitry.

11 Claims, 2 Drawing Sheets 5,495,301

THREE WIRE PILLOW SPEAKER WITH FULL TELEVISION REMOTE CONTROL FUNCTIONS

CROSS REFERENCE TO RELATED APPLICATION

This application discloses subject matter claimed in application Ser. No. 08/364,649 entitled THREE WIRE TELEVISION REMOTE CONTROL OPERABLE WITH KEY CLOSURES OR DATA PULSES filed of even data and assigned to Zenith Electronics Corporation.

BACKGROUND OF THE INVENTION AND PRIOR ART

This invention relates generally to wired television receiver remote control systems and specifically to such systems that are utilized in a hospital environment or the like.

Conventional hospital type television receivers are wired, i.e. connected by a multi wire cable, to a remotely located control unit that generally incorporates a small so-called pillow speaker. The most rudimentary systems involve three interconnecting wires and include a simple push button (key closure) for stepping the television receiver tuner sequentially through a plurality of television channels with one of the channel positions constituting an on/off position for the television receiver. The pillow speaker usually includes a simple variable resistor for controlling the volume of the sound produced. Such systems consist essentially of a push button switch and an audio volume control.

More elaborate systems may incorporate a greater number of wires, generally five, and may provide for channel up, channel down and separate on/off controls. They also have push button key closures for operating the channel controller and include a volume controllable pillow speaker.

The art has long recognized the need to provide a greater array of control functions that are accessible in the pillow speaker housing. Yet the need for a separate power supply to operate a multi function control signal generator, similar to conventional IR remote control encoders, as well as the need for the required additional wires to interconnect the pillow speaker and the television receiver have posed serious obstacles. One manufacturer used batteries in the pillow speaker unit in an effort to provide a variety of television control functions without using additional wires. Batteries pose their own problems, such as the need for periodic monitoring and replacement by hospital personnel and coupled with their cost, are not considered a viable solution. A further difficulty is that there are many existing installations with three and five wire interconnections and pillow speaker units. Consequently, any new or improved television receiver should ideally be retrofitable with existing wired remote control units.

The present invention solves all of the above-mentioned problems by providing a pillow speaker remote control that requires a minimum number of wires, draws its operating power from the television receiver, is capable of providing multi function remote control signals to the television receiver over the existing wires and is compatible with existing three and five wire pillow speaker control units.

OBJECTS OF THE INVENTION

A principal object of the invention is to provide an improved wired remote control system for a television receiver.

Another object of the invention is to provide a pillow speaker remote control that provides full functional remote control over a three wire cable.

A further object of the invention is to provide a wired remote control television receiver that is capable of being controlled by a number of control units.

An important object of the invention is to provide a novel three wire multi function remote control pillow speaker that is powered from a television receiver.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

Figure 1A:
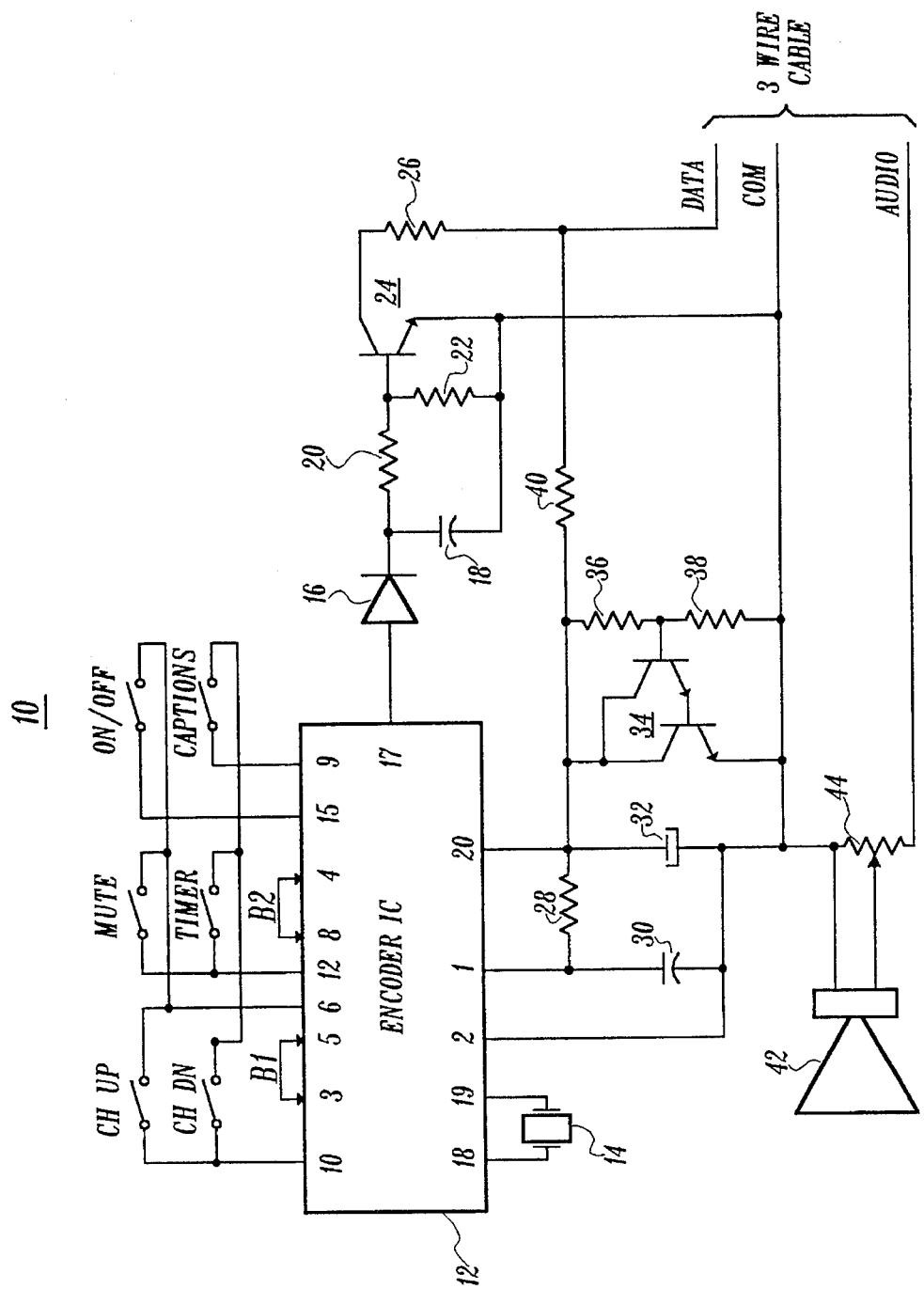
FIGS. 1A and 1B together are a schematic diagram of the portions of the television receiver and remote control constructed in accordance with the invention.
Figure 1B:
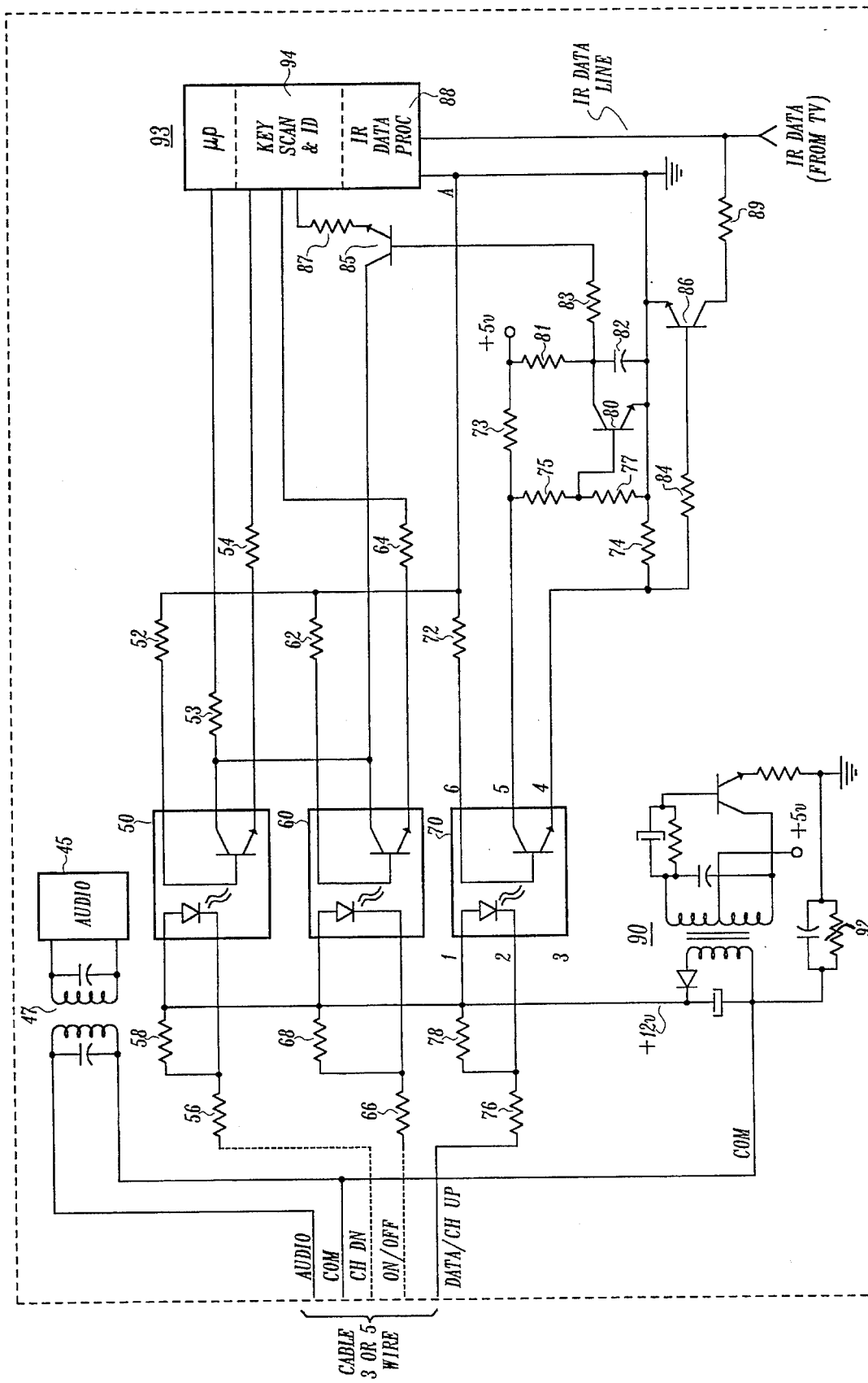

Referring to FIGS. 1A and 1B, a pillow speaker remote control device is generally designated by reference numeral 10. An encoder IC 12 is a multi function control signal generator for generating infrared (IR) pulses of 40 kilohertz frequency. Crystal 14 provides timing for encoder 12. A plurality of switches, appropriately labelled as to their respective functions, are connected to IC 12. A pair of jumpers B1 and B2, which may be used or omitted in accordance with which of two code patterns are to be transmitted by the pillow speaker remote control device to control a television receiver, are also shown. It will be appreciated that encoder IC 12 is well known in the prior art as are the various function switches, which generally comprise conductive rubber type switches in a keyboard array. The output of encoder 12 is supplied to a diode 16 and a filter capacitor 18 to remove the 40 kilohertz ultrasonic frequency. This results in an envelope of the data pulses being applied to a voltage divider comprising resistors 20 and 22, the junction of which is coupled to the base of a transistor 24. The emitter-collector circuit of transistor 24 is coupled through a resistor 26 to a pair of wires labelled DATA and COM (common) which is part of a three wire cable. As will be explained, power is supplied to encoder 12 from the television receiver over the DATA and COM lines. The DATA line is also connected through a series resistor 40 to a voltage divider, comprising resistors 36 and 38, which supplies the input of a Darlington connected pair of transistors 34 that function as a shunt regulator. A filter capacitor 32 is coupled across the output of the Darlington connected pair 34 and along with a resistor 28 and a capacitor 30 provides appropriate operating voltages to encoder 12. A potentiometer 44 is connected across an AUDIO line and the COM line and supplies a speaker 42. Potentiometer 44 controls the amount of audio signal supplied to the speaker 42 from the television receiver (shown in FIG. 1B).

Referring to the television receiver in FIG. 1B, the cable is indicated as having either three or five wires. It will be understood that installations that have a pillow speaker remote control that is constructed in accordance with FIG. 1A, only require three wires. The use of the additional wires is for the above-mentioned existing installations where the remote unit consists of one or two push buttons and a pillow speaker. In such installations, the push buttons are merely passive switches that are connectable between the various lines or wires. In a single switch installation the DATA/CH UP line and the COM line are bridged. In a five wire installation, that provides channel up, channel down and on and off control functions, the switches bridge the ON/OFF, the CH DN and the DATA/CH UP lines with the COM line, respectively. In all installations, the AUDIO and COM lines supply the potentiometer-controlled speaker.

For simplicity, only the pertinent control aspects of the television receiver are shown. An audio circuit 45 is coupled via an audio transformer 47 across the AUDIO and COM lines. A series of well known isolating opto couplers 50, 60 and 70 are shown. Each opto coupler consists of a light emitting diode (LED) that activates the base of a suitable output transistor. One or more of these opto couplers is used in the prior art receivers mentioned above. The output transistor of the opto coupler 70 is supplied to circuitry that enables it to be used for accepting either data signals, i.e. high frequency pulse trains, or key closures, i.e. channel up signals. The input LEDs of opto couplers 50, 60 and 70 are bridged by resistors 58, 68 and 78, respectively. The junctions of these resistors and the anodes of the LEDs are supplied with 12 volts DC from a power supply 90. Power supply 90 is conventional and oscillates at approximately 65 kilohertz to generate the 12 volt DC from a 5 volt DC input. The resistance capacitance network 92 between the power supply ground lead and the COM line precludes potentially dangerous charge buildup on the wires. The cathodes of the LEDs are coupled to respective wires in the cable via resistors 56, 66, and 76, respectively. The two leads labelled CH DN and ON/OFF are shown in dashed lines to indicate that they are not involved when utilizing the preferred embodiment of the remote control unit of FIG. 1A. The bases of the output transistors in opto couplers 50, 60 and 70 are connected, through respective resistors 52, 62 and 72, to a junction A which is shown as a ground. This potential is the lowest reference potential for the key scan circuits (94) and data processing circuits (88) of the television receiver.

The collector of the output transistor in opto coupler 70 is connected through a resistor 73 to a source of +5 volts DC, while its emitter is coupled through a resistor 74 to a junction of A. A voltage divider consisting of resistors 75 and 77 is connected between +5 volts and junction A (ground). The tap on the voltage divider is coupled to the base of a transistor 80 whose collector is coupled through a resistor 81 to +5 volts. A storage capacitor 82 is connected across the collector-emitter junction of transistor 80. A resistor 83 is connected between the collector of transistor 80 and the base of a transistor 85 that has its collector connected to the commonly connected collectors of the output transistors in opto couplers 50 and 60 and its emitter connected through a resistor 87 to a microprocessor block 93 including a KEY SCAN & ID 94 (key scanning and identification). The emitter of the transistor in opto coupler 70 is also connected through a resistor 84 to the base of an IR data transistor 86 that has its collector connected through a resistor 89 to an IR data processing block 88 in microprocessor 93 and its emitter connected to junction A. As indicated, IR data may also be applied to IR data processor 88 from the television receiver circuitry. In a conventional (i.e, non hospital) type television receiver, this IR data would be received from an IR receiver that processes remotely transmitted IR control signals.

In operation, DC power is supplied to the pillow speaker device from power supply 90 via the DATA line and the COM line. A current source is defined through resistor 40 and must be sufficient to accommodate the worst case scenario of power requirements of encoder 12. The current requirement of encoder 12 ranges from a few microamperes during standby to about 1 milliampere (average) during data pulse times. Providing the voltage regulator (Darlington transistors 34) enables a constant current load to be seen by the television receiver whether the encoder IC is encoding data pulses or is in a standby condition. This precludes dangerous voltage conditions for encoder 12, because of the wide variation in current supplied during pulse times and standby, and makes the task of separating data from standby current simpler in the television receiver. The small amount of extra current during the data pulse on time (predominantly the base drive current for transistor 24) comes from capacitor 32 since the duty cycle is low. The data pulses are sent as a loop current increase during the periods that transistor 24 is on. The control loop current is 1 milliampere per speaker assembly (in standby) and rises to something on the order of 7 milliamperes during pulse time.

In FIG. 1B, transistor 80 effectively discriminates between relatively high frequency data pulses and key closures, which represent DC short circuits across the various lines. (The DC short circuit condition across the DATA and the COM lines generates a current that is close to 10 milliamperes.) Looking first at the data path, the 7 milliampere current pulses in the control loop pass through the emitter portion of opto coupler 70 which results in its output transistor being switched on and off by the optically coupled energy. This appears as a positive going signal of about 500 microamperes at pin 4 of opto coupler 70. The current is supplied to the base of transistor 86 which pulls the IR DATA line down during each pulse. This generally replicates the output of the IR receiver (not shown) in the television receiver and is sent to IR data processor 88. A DC short circuit, corresponding to a switch closure across the DATA and COM lines, results in a LOW on the IR DATA line for as long as the switch closure is maintained. This LOW is ignored by the logic in microprocessor 93 and no action takes place. Thus, in response to a data signal, transistor 86 passes the data signal to the IR data processor 88. In response to a key closure, however, transistor 86 simply, pulls the IR DATA line LOW which is ignored by microprocessor 93.

The response of the remainder of the circuitry to a key closure is as follows. When the output transistor of opto coupler 70 is on, the voltage at pin 5 of opto coupler 70 is reduced from +5 volts to approximately +1 volt. The voltage at pin 5 is divided by resistors 73, 75 and 77, with approximately 25% of the voltage at pin 5 appearing at the base of transistor 80. When pin 5 is high (+5 volts), the resulting current keeps transistor 80 turned on. When pin 5 is low (+1 volt), the resulting voltage at the base of transistor 80 is insufficient to keep it on and transistor 80 is turned off. This permits capacitor 82 to begin charging through resistor 81 from the +5 volt source. Since each data pulse is on the order of 500 microseconds in duration, only a small voltage appears on capacitor 82 before transistor 80 is again turned on, which rapidly reduces the voltage across capacitor 82 to zero. This timing circuit therefore maintains transistor 85 in the off state during data pulses. When opto coupler 70 is conductive for a sufficient time (about 10 milliseconds), capacitor 82 charges to a voltage sufficient to turn on transistor 85, which connects the appropriate lines on the keyboard scan matrix resulting in a channel up operation from the microprocessor. Therefore long term high currents in the control loop, i.e. currents greater than 10 milliseconds in duration, are passed to the microprocessor 93 as key scan inputs and short time high currents, i.e. about 500 microseconds in duration, are passed to the IR data processor 88. The small difference between the data pulse loop current and the DC short loop current is ignored by the system. The separation of the DC and data is accomplished solely based upon time. In a five wire installation, opto couplers 50 and 60 will respond similarly to key closures across their respective input connections to activate their respective key scan inputs. Thus the inventive system functions with existing 3 wire and 5 wire remote pillow speakers as well as with the full function remote control pillow speaker of the invention.

What has been described is a novel pillow speaker wired remote control system for a television receiver. It is recognized that numerous changes in the described embodiment of the invention will be apparent to those skilled in the art without departing from its true spirit and scope. The invention is to limited only as defined in the following claims.

What is claimed is:

1. A method of operating a television receiver wired to a remote housing including a speaker and a multi function control signal encoder comprising:

supplying operating power to said multi function control signal encoder from the television receiver over first and second wires;

supplying audio signals to said speaker from said television receiver over said first wire and a third wire; and supplying encoded control signals from said multi function encoder to said television receiver over said first and second wires.

2. The method of claim 1 wherein said encoder requires low current during standby and a relatively higher current during data signal generation; and further including regulating the current flow to said encoder.

3. The method of claim 1 wherein said encoder generates data pulses of ultrasonic frequency; and further comprising filtering said data pulses to substantially remove said ultrasonic frequency and generate an envelope of said data pulses.

4. A method of operating a television receiver wired to a remote housing including a speaker and a multi function control signal encoder comprising:

supplying operating power to said multi function control signal encoder from said television receiver over first and second wires;

supplying audio signals to said speaker from said television receiver over said first wire and a third wire;

said encoder requiring low current during standby and a relatively higher current during data signal generation;

regulating the current flow to said encoder;

producing a data signal comprising pulses of ultrasonic frequency from said encoder;

filtering said data signal to substantially remove said ultrasonic frequency and produce an envelope of said data signal; and supplying said envelope from said multi function encoder to said television receiver over said first and second wires.

5. A pillow speaker remote control for a television receiver connected by first, second and third wires comprising:

a multi function control signal encoder;

means for supplying operating power to said encoder from said television receiver over said first and said second wires;

means for supplying an audio signal to said pillow speaker from said television receiver over said first wire and said third wire; and means for supplying encoded control signals from said encoder to said television receiver over said first and said second wires.

6. The control of claim 5 further including regulating means for controlling current flow to said encoder.

7. The control of claim 5 wherein said encoder generates data pulses of ultrasonic frequency and further including means for filtering said data pulses to remove said ultrasonic frequency and to generate an envelope of said data pulses.

8. A pillow speaker remote control for a television receiver connected by first, second and third wires comprising:

a multi function control signal encoder;

means for supplying operating power to said encoder from said television receiver over said first and said second wires;

regulating means for controlling current flow to said encoder;

means for supplying an audio signal to said pillow speaker from said television receiver over said first wire and said third wire;

said multi function encoder developing data pulses of ultrasonic frequency;

filtering means for removing said ultrasonic frequency and generating an envelope of said data pulses; and means for supplying said envelope of data pulses to said television receiver over said first and said second wires.

9. The remote control of claim 8 wherein said regulating means comprises a Darlington transistor arrangement and a storage capacitor coupled across the output of said Darlington transistor arrangement.

10. The remote control of claim 9 further including a transistor coupled to the output of said filtering means for supplying said envelope of data pulses to said first and second wires.

11. The remote control of claim 10 further including an additional pillow speaker remote control for controlling said television receiver connected by said first, second and third wires and including an additional multi function control signal encoder.

\* \* \* \* \*